(12) United States Patent
Borrelli et al.

(10) Patent No.: US 7,799,711 B2
(45) Date of Patent: Sep. 21, 2010

(54) PHOTOMACHINABLE GLASS COMPOSITIONS HAVING TUNABLE PHOTOSENSITIVITY

(75) Inventors: Nicholas Francis Borrelli, Elmira, NY (US); Kathryn L Goetschius, Wellsville, NY (US); Charlene Marie Smith, Corning, NY (US)

(73) Assignee: Corning Incorporated, Corning, NY (US)

(*) Notice: Subject to any disclaimer, the term of this patent is extended or adjusted under 35 U.S.C. 154(b) by 496 days.

(21) Appl. No.: 11/897,823

(22) Filed: Aug. 31, 2007

(65) Prior Publication Data

US 2009/0062102 A1    Mar. 5, 2009

(51) Int. Cl.
*C03C 4/00* (2006.01)
*C03C 3/095* (2006.01)
*C03C 3/083* (2006.01)

(52) U.S. Cl. .............................. 501/13; 501/64; 501/68

(58) Field of Classification Search .................. 501/11, 501/13, 32, 54, 55, 64, 68
See application file for complete search history.

(56) References Cited

U.S. PATENT DOCUMENTS

| | | | |
|---|---|---|---|
| 2,323,059 A | 6/1942 | Land | |
| 2,515,939 A | 7/1950 | Stookey | |
| 2,515,940 A | 7/1950 | Stookey | |
| 2,515,941 A | 7/1950 | Stookey | |
| 2,559,805 A | 7/1951 | Stookey | |
| 2,628,160 A | 2/1953 | Stookey | |
| 2,651,145 A | 9/1953 | Stookey | |
| 2,651,146 A | 9/1953 | Stookey | |
| 2,684,911 A | 7/1954 | Stookey | |
| 3,666,414 A | 5/1972 | Burscheid | |
| 3,950,591 A * | 4/1976 | Gliemeroth et al. ......... | 428/432 |
| 4,979,975 A | 12/1990 | Borrelli et al. | |
| 5,043,002 A | 8/1991 | Dobbins et al. | |
| 5,154,744 A | 10/1992 | Blackwell et al. | |
| 6,132,643 A * | 10/2000 | Pavel ................... | 252/301.4 R |
| 7,262,144 B2 * | 8/2007 | Schreder et al. ................ | 501/66 |
| 7,429,546 B2 * | 9/2008 | Iwahashi et al. ............... | 501/54 |
| 7,462,574 B2 * | 12/2008 | Iwahashi et al. ............... | 501/54 |
| 7,524,783 B2 * | 4/2009 | Koyo et al. .................... | 501/65 |
| 2003/0100431 A1* | 5/2003 | Koyo et al. .................... | 501/55 |
| 2005/0245383 A1* | 11/2005 | Iwahashi et al. ............... | 501/54 |
| 2005/0272590 A1* | 12/2005 | Iwahashi et al. ............... | 501/55 |

FOREIGN PATENT DOCUMENTS

CN   1810691 A  *  8/2006
CN   1810692 A  *  8/2006

OTHER PUBLICATIONS

Derwent Abstract 2006-800882, English Abstract of CN 1810692 A, Aug. 2, 2006.*
Derwent Abstract 2006-800881, English Abstract of CN 1810691 A, Aug. 2, 2006.*

* cited by examiner

*Primary Examiner*—Karl E Group
*Assistant Examiner*—Elizabeth A Bolden
(74) *Attorney, Agent, or Firm*—Walter M. Douglas

(57) ABSTRACT

The invention is directed to photomachinable glass compositions having a controllable or tunable photosensitivity, and to a method for making such compositions. The compositions of the invention contain titania ($TiO_2$) in an amount in the range of greater than 0.01 wt. % to 2 wt. % added to any known photomachinable glass composition. In one embodiment the $TiO_2$ in an amount in the range of greater than 0.01 wt. % to 1 wt. %. An example of a photomachinable glass of the invention is one having a composition having, in weight percent (wt. %) of 65-80% $SiO_2$, 15-20% $Li_2O$, 1-4% $Na_2O$, 1-4% $K_2O$, 2-10% $Al_2O_3$, 0-3% ZnO, 0-0.15% $Sb_2O_3$, 0-0.015% $CeO_2$, 0-0.001% Au, 0-0.015% Ag and >0.01% to 2% $TiO_2$, and the sum of Au+Ag is greater than zero. In particular embodiment the $TiO_2$ is in the range of >0.01% to 1%.

6 Claims, 4 Drawing Sheets

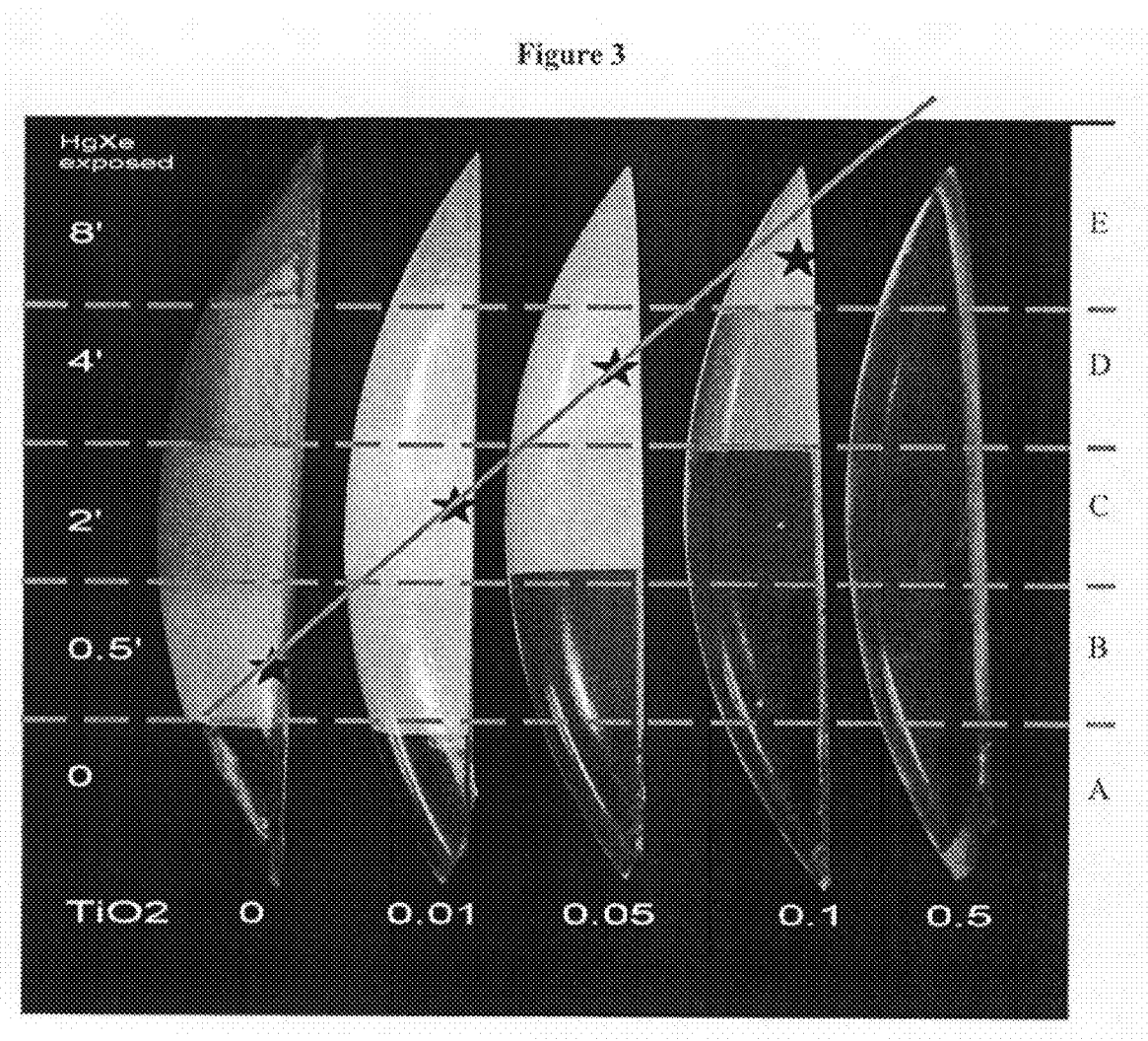

PHOTOMACHINABLE GLASS COMPOSITIONS HAVING TUNABLE PHOTOSENSITIVITY

FIELD OF THE INVENTION

The invention relates to a photomachinable glass composition having a tunable photosensitivity. The photomachinable glass composition of the invention enables one to control the exposure sensitivity of the glass without affecting the final processing of the glass or the properties of a finished product made using the photomachinable glass composition.

BACKGROUND OF THE INVENTION

The known photomachinable ("PM") glass compositions are Fotoform™ (Corning Incorporated) and Foturan® (Schott Glass). By photomachinable is meant that after the glass is covered with a patterned photomask and exposed to ultraviolet radiation (the UV range is approximately 100-400 nm), the glass is then subjected to a specified thermal treatment to form crystallites in the area that was exposed to the radiation, but not in the areas covered by the photomask which blocks the radiation from reaching the glass, and is further subjected to chemical removal of selected material from the glass. The term "photomachinable" may be viewed as a combination of the terms "photolithographicable" and "chemically machinable." The resulting glass-crystal composite material (that is, the material formed in the exposed or pattern areas of the glass not covered by the photomask) is preferentially soluble in hydrofluoric acid relative to the unexposed glass (that is, glass covered by the photomask and not exposed to the radiation). This permits one to make patterns desirable for a particular application using a conventional photolithographic processes. For example, the patterns can be holes and cavities, designs such as pictures, leaves or flowers, writing such as script or block letters, channels, and other patterns as may be desirable for a particular application. There were numerous commercial applications that utilized these photomachinable materials where the refractive nature of the material along with chemical durability, non-magnetic and electrical insulating properties made it unique. However, when one uses modern lasers some problems have arisen.

Photomachinable glasses are based on photosensitively opacifiable glasses (also called "opal glasses") having a lithium disilicate and/or lithium metasilicate (also called lithium monosilicate) crystallite phase. Photosensitively opacifiable glasses which do not contain lithium are described U.S. Pat. Nos. 2,515,939, 2,515,941, 2,559,805, 2,651,145, and 2,651,146. Photosensitively opacifiable glasses that do contain lithium disilicate and/or lithium metasilicate are described in U.S. Pat. Nos. 2,515,940, 2,628,160 and 2,684,911. Opal glasses with patterns or designs are formed by masking an appropriate glass composition with a patterned mask, subjecting it to radiation in a photolithographic process and a subsequent heat treatment as briefly described in the preceding paragraph and in detail in 2,515,939, 2,515,941, 2,559,805, 2,651,145, and 2,651,146. In addition, U.S. Pat. Nos. 2,628,160 and 2,684,911 describe the chemical machining of an opalized glass (photosensitive) containing lithium disilicate and/or lithium metasilicate, for example, by use of a dilute hydrofluoric acid solution. The radiation used in the foregoing patents was supplied using ultraviolet emitting lamps, for example, Hg or Hg—Xe arc lamps, which flooded the entire surface (lithographic mask and exposed glass) of the article being irradiated with less than 400 nm radiation. U.S. Pat. No. 2,515,939 indicates that generally the time and intensity of the radiation necessary to produce the desired effect was determined by trial. U.S. Pat. No. 2,515,941 indicates that for a given composition different colors can be developed in the gas with using different radiation exposure times.

In modern processes, the exposure of the PM glass is accomplished using programmed, focused laser writing protocols. The typical lasers that are used in these processes are high powered pulsed lasers operating at 266 nm and 355 nm. These pulsed lasers have an average power in excess of 1 W, the peak power being delivered with each pulse being much higher. It is desirable to be able to control the exposure sensitivity of the glass without adversely affecting the ultimate processing of the glass or the properties of the finished part made using the PM glass. Examples of such properties and processes that should remain unaffected or minimally effected (that is, the effect is not detrimental to the ultimate intended use or product) include the thermal development schedule, the rate of etching, the microstructure, the degree of warping and the surface smoothness of the product. The particular laser exposure (wavelength and power) that is being used will determine the optimum exposure sensitivity level (recall, exposure is an energy process and not an intensity one). Prior art glasses which have a 'single' sensitivity are thus not suitably useful industry-wide for different applications due to the differences in laser writing systems used throughout the industry. Consequently, there is a need for tailoring the sensitivity of photomachinable glass compositions, in a reproducible and economical manner, so that they can be used with different laser photolithographic systems

SUMMARY OF THE INVENTION

In one embodiment the invention is directed to photomachinable glass compositions having a controllable or tunable photosensitivity, and to a method for making such compositions. The compositions of the invention contain titania ($TiO_2$) in an amount in the range of greater than 0.01 wt. % to 2 wt. % (that is, >0.01 wt. % to 2 wt. %) added to any known photomachinable glass composition. In one embodiment the $TiO_2$ in an amount in the range of greater than 0.01 wt. % to 1 wt. % (that is, >0.01 wt. % to 1 wt. %). In a further embodiment the $TiO_2$ in an amount in the range of greater than 0.01 wt. % to 0.5 wt. % (that is, >0.01 wt. % to 0.5 wt. %).

In another embodiment the invention is directed to photomachinable glass compositions having a controllable or tunable photosensitivity, said glass comprising, in weight percent (wt. %), 65-80% $SiO_2$, 15-20% $Li_2O$, 1-4% $Na_2O$, 1-4% $K_2O$, 2-10% $Al_2O_3$, 0-3% ZnO, 0-0.15% $Sb_2O_3$, 0-0.015% $CeO_2$, 0-0.001% Au, 0-0.015% Ag and >0.01% to 2% $TiO_2$, and the sum Au+Ag is greater than zero. In another embodiment $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

In further embodiment the invention is directed to photomachinable glass compositions having a controllable or tunable photosensitivity, said glass comprising, in weight percent (wt. %), 70-80% $SiO_2$, 15-20% $Li_2O$, 1-2% $Na_2O$, 2-4% $K_2O$, 2-4% $Al_2O_3$, 0-2% ZnO, 0.05-0.15% $Sb_2O_3$, 0.005-0.015% $CeO_2$, 0-0.001% Au, 0.05-0.015% Ag and >0.01% to 2% $TiO_2$, and the sum Au+Ag is greater than zero. In another embodiment $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

In an additional embodiment the invention is directed to photomachinable glass compositions having a controllable or tunable photosensitivity, said glass comprising, in weight percent (wt. %), 65-75% $SiO_2$, 15-20% $Li_2O$, 1-4% $Na_2O$, 1-2% $K_2O$, 5-10% $Al_2O_3$, 1-3% ZnO, 0-0.05% $Sb_2O_3$, 0-0.005% $CeO_2$, 0-0.001% Au, 0-0.05% Ag and >0.01% to 2% $TiO_2$, and the sum Au+Ag is greater than zero. In another embodiment $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

In a further embodiment the invention is s directed to glass articles made of a photomachinable glass having a tunable sensitivity, the photomachinable glass containing titania ($TiO_2$) in an amount in the range of greater than 0.01 wt. % to 2 wt. %. In a one embodiment the $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

In a further embodiment the invention is s directed to glass articles made of a photomachinable glass having a controllable or tunable sensitivity, the photomachinable glass having a composition, in weight percent (wt. %), 65-80% $SiO_2$, of 15-20% $Li_2O$, 1-4% $Na_2O$, 1-4% $K_2O$, 2-10% $Al_2O_3$, 0-3% ZnO, 0-0.15% $Sb_2O_3$, 0-0.015% $CeO_2$, 0-0.001% Au, 0-0.015% Ag and >0.01% to 2% $TiO_2$, and the sum Au+Ag is greater than zero. In another embodiment $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

In a further embodiment the invention is s directed to glass articles made of a photomachinable glass having a controllable tunable sensitivity, the photomachinable glass having a composition, in weight percent (wt. %), of 70-80% $SiO_2$, 15-20% $Li_2O$, 1-2% $Na_2O$, 2-4% $K_2O$, 2-4% $Al_2O_3$, 0-2% ZnO, 0.05-0.15% $Sb_2O_3$, 0.005-0.015% $CeO_2$, 0-0.001% Au, 0.05-0.015% Ag and >0.01% to 2% $TiO_2$, and the sum Au+Ag is greater than zero. In another embodiment $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

In a further embodiment the invention is s directed to glass articles made of a photomachinable glass having a controllable or tunable sensitivity, the photomachinable glass having a composition, in weight percent (wt. %), of 65-75% $SiO_2$, 15-20% $Li_2O$, 1-4% $Na_2O$, 1-2% $K_2O$, 5-10% $Al_2O_3$, 1-3% ZnO, 0-0.05% $Sb_2O_3$, 0-0.005% $CeO_2$, 0-0.001% Au, 0-0.05% Ag and >0.01% to 2% $TiO_2$, and the sum Au+Ag is greater than zero. In another embodiment $TiO_2$ is in the range of >0.01% to 1%. In a further embodiment the $TiO_2$ in an amount in the range of greater than 0.01 wt. % to 0.5 wt. % (that is, >0.01 wt. % to 0.5 wt. %).

BRIEF DESCRIPTION OF THE DRAWINGS

FIG. 3 is a illustration showing the onset of opalization as a function of radiation exposure time and titania content.

DETAILED DESCRIPTION OF THE INVENTION

Figure 1:
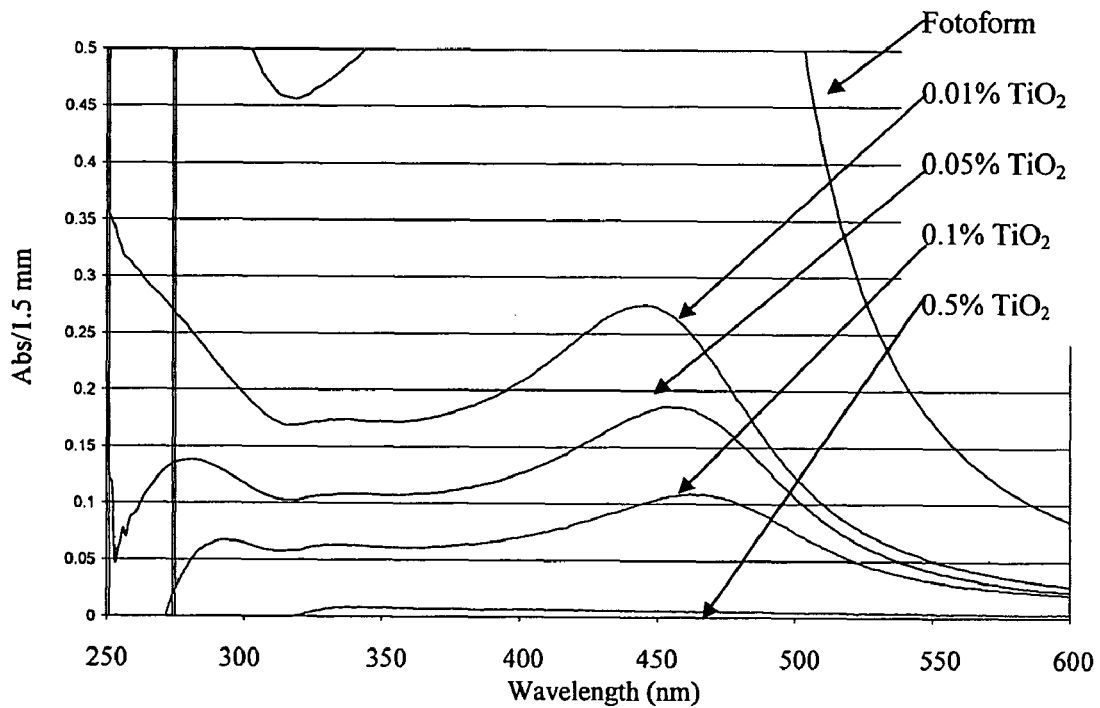
FIG. 1 is a graph of the absorbance vs. wavelength of a prior art glass (Fotoform™, no $TiO_2$) and glasses according to the present invention containing different levels of $TiO_2$, melted melting at 1450° C., 16 minute irradiation and a 500° C., 1 hour, air atmosphere silver nucleation step.

All compositions herein are given in weight percent (wt. %) as the oxide unless specified otherwise, except for Au and Ag which can be in terms of an oxide or a halide without substantial effect on the composition amounts of the other components because of the very low amounts of these metal or metal ions in the glass compositions.

As used herein the term "photomachinable glass or glasses" refers to photosensitively opacifiable glasses (also called "opal glasses") having a glass phase and an opalizable phase that has at least one crystalline component, the opalizable phase being etchable by an etching solution. Examples of such etchable phases are those in which the crystalline component is lithium disilicate and/or lithium metasilicate, with the preference being for glass in which lithium metasilicate is the majority of the crystalline phase because of it greater susceptibility to and solubility in an etching solution. These lithium containing crystallites are formed during heat treatment after a glass containing a lithium oxide has been irradiated and subjected to a heat treatment as described in the art. Further, as used herein the terms "controllable or tunable sensitivity", "controllable sensitivity" and "tunable sensitivity" all mean controlling or tuning the sensitivity of a PM glass to radiation in the UV range by the addition of $TiO_2$ in an amount or range as set forth herein such that the formation of a selected opalized phase in the $TiO_2$-containing glass requires longer UV exposure time relative to a glass of the same formulation that does not contain $TiO_2$.

In one aspect the invention is directed to determining the optimum sensitivity of a photomachinable glass so that such glass can be used with the modern, high energy pulsed laser writing exposure systems. An example of a state-of-the-art laser writing system suitable for writing patterns on photosensitive glasses such as Fotoform™ is a tripled YAG laser operating at 355 nm with an average power of 8-20 W depending on the repetition rate of 50-300 kHz. Ideally, in a scanning system one would like to use the highest repetition rate possible in order to approximate a continuous exposure. This approximation is determined by the linear distance the exposure beam moves between pulses; that is, the linear velocity of the scanning beam divided by the repetition rate. Table 1 illustrates the "distance the exposure beam moves" (DEBM) in μm as a function of the beam's the "linear velocity" (LV) in cm/s and repetition rate (Rep-Rate=50, 100, 200 and 300 kHz) in $sec^{-1}$.

TABLE 1

| | DEBM in μm as a Function of Rep-Rate ($sec^{-1}$) | | | |
|---|---|---|---|---|
| LV (cm/s) | 50 kHz | 100 kHz | 200 kHz | 300 kHz |
| 1 | 0.2 | 0.1 | 0.05 | 0.03 |
| 10 | 2 | 1.0 | 0.5 | 0.3 |
| 50 | 10 | 5 | 2.5 | 1.5 |
| 100 | 20 | 10 | 5 | 3 |

To meet a quasi-continuous criterion for laser writing the distance traveled from pulse-to-pulse should be at least 1/10 the focus spot size otherwise one would have a nodulation of the exposure; that is, the exposure would be non-uniform along the path of the beam. In addition, it is desirable to operate at the highest repetition rate so that the writing time is a minimum consistent with the above quasi-continuous condition. Further, it is desirable to use the total power available, otherwise one has to reduce the intensity by some means which constitutes a waste of energy.

By way of illustration, using a 300 kHz laser operating at a linear velocity of 50 cm/s and assuming a 20 μm diameter focal spot size, which is consistent with the spatial resolution possible in the photo-machinable glass, the exposure fluence J in joules/cm² for a scanning beam is given by the following expression.

$$J = P/V \times D,$$

where P is the average laser power in watts, V is the linear velocity in cm/s of the stage or beam, and D is the diameter of the beam in cm. This equation gives an exposure density of 80 J/cm². The reported sensitivity of the commercial available photo-machinable glasses is of the order of 2-4 J/cm² for Fotoform™ and 8-32 J/cm² for Foturan™. In order to satisfy the above optimal use of the laser exposure system, one would need to decrease the exposure sensitivity by a factor of 20 for Fotoform™, and 3 for Foturan™.

We have found that by introducing titania ($TiO_2$) into a photomachinable glass formulation it is possible to reduce the sensitivity of a photomachinable glass to laser radiation. For example, with the addition of 0.5% titania the sensitivity of a photomachinable glass composition such as Fotoform™ can be reduced by a factor of 16. This reduction in sensitivity will allow one to use the optimum laser conditions for laser writing of a photomachinable glass. That is, the reduction in sensitivity will allow one to use the full available laser power with no attenuation and a fast writing speed. That is one can use the laser at its highest output level, highest repetition rate and highest linear speed.

As indicated above, in modern processes the exposure of the PM glass is accomplished using programmed, focused pulsed laser writing protocols. The typical lasers that are used in such processes are pulsed lasers operating at 266 nm and 355 nm. It is desirable to be able to control the exposure sensitivity of the glass without adversely affecting the ultimate processing of the glass or the properties of the finished part. Such properties and processes are the thermal development schedule, the etch rate, and the surface smoothness. The particular laser exposure (wavelength and power) that is being used will determine the optimum exposure sensitivity level of the PM glass. Prior art glasses which have a 'single' sensitivity are not suitably useful industry-wide for different applications due to the differences in laser writing systems. The present invention solves this PM glass problem by tailoring the sensitivity of PM glass compositions, in a reproducible and economical manner.

However, while tailoring the photosensitivity of a PM glass is important for using the glass with modern, high power pulsed lasers, it is also necessary that the PM glass be able to be processed using the same techniques as are currently used for the process of PM glasses such as Fotoform™. That is, it is desirable to retaining the same heat treatment and chemical etch procedures as are used in making an article using a current PN glass so that changes to the current manufacturing processes are unnecessary or are minimized. In addition, the final product should have the same microstructure and "feature resolution" as is present in an article made from the known PM glasses. "Feature resolution" means that the sharpness or definition of the lines, sidewalls or other features that remain after the etching process.

Thus, the present invention is directed to a method for controlling the exposure sensitivity of photomachinable ("PM") glasses to a desired level by the appropriate doping of the "green" or "base" glass with $TiO_2$. This doping of the green glass does not alter the other important attributes of the photomachinable glass nor its subsequent treatment steps. In accordance with the invention, base glass compositions having, in weight percent, 65-80% $SiO_2$, 15-20% $Li_2O$, 1-4% $Na_2O$, 1-4% $K_2O$, 2-10% $Al_2O_3$, 0-3% ZnO, 0-0.15% $Sb_2O_3$, 0-0.015% $CeO_2$, 0-0.001% Au, 0-0.015% Ag, are doped with >0.01% to 2% $TiO_2$ to control the photosensitivity of the glass $TiO_2$, and the sum Au+Ag is greater than zero. In another embodiment the $TiO_2$ content is in the range of >0.01% to 1%. In a further embodiment the $TiO_2$ in an amount in the range of greater than 0.01 wt. % to 0.5 wt. % (that is, >0.01 wt. % to 0.5 wt. %).

In one embodiment a particular base glass has a compositional range of 70-80% $SiO_2$, 15-20% $Li_2O$, 1-2% $Na_2O$, 2-4% $K_2O$, 2-4% $Al_2O_3$, 0-2% ZnO, 0.05-0.15% $Sb_2O_3$, 0.005-0.015% $CeO_2$, 0-0.001% Au, 0.05-0.015% Ag, this base glass being doped with >0.01% to 2% $TiO_2$, $TiO_2$, and the sum Au+Ag is greater than zero.

In another embodiment the $TiO_2$ content is in the range of >0.01% to 1%. In a further embodiment the $TiO_2$ in an amount in the range of greater than 0.01 wt. % to 0.5 wt. % (that is, >0.01 wt. % to 0.5 wt. %).

In another embodiment a particular base glass has a compositional range of 65-75% $SiO_2$, 15-20% $Li_2O$, 1-4% $Na_2O$, 1-2% $K_2O$, 5-10% $Al_2O_3$, 1-3% ZnO, 0-0.05% $Sb_2O_3$, 0-0.005% $CeO_2$, 0-0.001% Au, and 0-0.05% Ag, this base glass being doped with >0.01% to 2% $TiO_2$, and the sum Au+Ag is greater than zero. In another embodiment the $TiO_2$ content is in the range of >0.01% to 1%. In a further embodiment the $TiO_2$ in an amount in the range of greater than 0.01 wt. % to 0.5 wt. % (that is, >0.01 wt. % to 0.5 wt. %).

The $TiO_2$-containing photomachinable glasses of the invention can be prepared using glass making methods known in the art; for example without limitation, the methods described U.S. Pat. Nos. 4,979,975, 2,684,911 and other patents cited elsewhere herein regarding opalizable glasses, the patents or references cited therein, and other patent and/or references known to those skilled in the art. Typically, except for the noble metals Au and Ag, oxides, metal carbonates, hydroxides and hydrates thereof, or mixtures of any of the foregoing, are used in preparing the photomachinable glass compositions. While Au and Ag can be added as oxides, metal carbonates, hydroxides and hydrates, it is preferred that they be added as halides (Cl, Br and I), nitrates, nitrites or other compounds known in the art to be useful for making photosensitive, photochromic or polarizing glasses.

The titanium can be added as an oxide, carbonate or hydroxide, or a hydrate thereof. Alternatively, finely divided titania and/or silica-titania "soot or particles" can be prepared by flame hydrolysis or other methods known in the art, for example without limitation, U.S. Pat. Nos. 5,154,744, 5,043, 002, 3,666,414, and 2323059 using titanium tetrachloride, silicon tetrachloride, organotitanium compounds, organosilicon compounds and other silicon and titanium compounds known in the art. The resulting "soot" is then added to the other materials [used to make the glass composition] in the amount required to achieve the appropriate level of titania in the photomachinable glass product (e.g., >01% to 2% by weight). In another alternative, very finely divided titania can be purchased commercially or prepared by flame hydrolysis of titanium tetrachloride or an organotitanium compound, and the titania so produced is added to the photomachinable glass composition prior to melting.

The noble metals Au and Ag can be added to the glass batch as oxides, carbonates, nitrates or halides, or hydrates thereof. The preferred noble metal compounds are halides (chloride or bromide) nitrates and nitrites. In all glass compositions, while the noble metals Ag and Au can individually be zero, the sum of Ag+Au is greater than zero.

The materials used for making the glass composition are mixed, for example without limitation, by ball milling or roller mixing, placed in a vessel and melted under oxidizing conditions to form the $TiO_2$-doped photomachinable glass composition. The resulting photomachinable glass composition is then processed into the desired form for the subsequent irradiation using a UV radiation source, heat treating and etching steps, and any additional steps as may be necessary to make the desired product. Hydrofluoric acid solutions containing not more than 20 wt. % HF can be used as the etching solutions. In one embodiment the etching solutions are 10 wt. % HF solutions. Examples, without limitation, of the forms are glass sheets that can be used in electronic devices such as cell phones, computer or monitor screens, personal music players and decorative windows; telecommunication devices such as photonic crystals; and vases.

There are really three separate phenomena that ultimately determine the optimum exposure. However, it is difficult to separate the UV exposure level and the thermal development schedule, but for the sake of illustration we are going to assume that the latter is a fixed schedule. Without being held to any particular theory it is believed that the following discussion is an accurate of what occurs when one forms, irradiates heats treats and etches an articles using a PM glass.

The first step is the photo excitation and trapping of an electron from somewhere. In the Fotoform glasses this process is aided by the addition of $Ce^{+3}$. The $Ce^{+3}$ has a characteristic absorption feature at 310 nm corresponding to the 4f-5d transition. It has been hypothesized that the 5d states of the $Ce^{+3}$ overlap (mix) to some extent with the conduction states of the glass. This essentially delocalizes the electron allowing it some range in the conduction band of the glass. The model is that some of these electrons get trapped into rather deep states. These states seem to be associated with non-bridging oxygen atoms simply because without non-bridging oxygen glasses are not photosensitive. Electron paramagnetic resonance (EPR) shows evidence of trapped electrons (holes) as well as an absorption edge shift after exposure to UV light. One can write Equation Set 1 representing these activities as follows, where hv is the photon of UV light, +3+ represents an excited state $Ce^{+3}$ ion, e is an electron, T is an empty trap somewhat below the conduction band of the glass, $T_e$ is trapped electron, $e_v$ is a valence band electron, T' is an empty hole trap somewhat above the valence band, and $T_h$ is the filled hole trap $Ce^{+3}+hv \rightarrow Ce^{+3+}+e$ $e+T \rightarrow T_e$  (1)

$Ce^{+3+}+e_v \rightarrow Ce^{=3}$ $h+T'' \rightarrow T'_h$

The latter equations are suggested by the fact that the $Ce^{+3}$ absorption feature seems not to change during exposure that is the $Ce^{+3}$ is being replenished. All these phenomena occur at room temperature.

If one heats the glass sufficiently so that the electrons and holes are excited back into their respective bands of the glass we have the second step of the process. The elevated temperature (500 C or so) produces another effect which is that is it gives the $Ag^{+1}$ ions contained within the glass mobility. For example, suppose the electrons are in shallow traps. Room temperature corresponds to 0.023 eV, thus a temperature of 500 C corresponds to an energy of 0.06 eV When they are thermally excited out of these shallower traps they can either recombine with the holes in the valence band, or they can combine with a mobile $Ag^{+1}$ ion. Some authors have conjectured that the trap may very well be some sort of $Ag_n^+$ species. The competition then is between the recombination of the electrons in the conduction with the thermally released holes in the valence band and the $Ag_n^0$ formation. It is important that the trap depth of the holes is deeper than that of the electron trap allowing the electrons a greater range to combine with the $Ag^{+1}$. It has been shown that when one carries out the heating too rapidly one can favor the recombination and frustrate the silver formation because of the slower mobility of the $Ag^{+1}$ relative to the electron. This series of events is represented by Equation Set 2.

$T_e+heat \rightarrow T+e$ $e+Ag_n^+ \rightarrow Ag_n^0$  (2)

$T_h+heat \rightarrow T'+h$ $e+h \rightarrow hv$

The next step is the aggregation of the silver atoms into a silver particle. This step again requires heat primarily to allow the silver particle to grow. This is the classic photosensitive process leading to silver ruby glasses. In other words, when the final state is the silver particles ($Ag^0$), then the absorption of these metal particles produces the characteristic surface plasmon resonance one see at 400 nm for silver.

Nucleation of the lithium metasilicate by the silver particles is the next event to occur. While some parties like to separate the nucleation and growth temperature regimes, there is no doubt that a specific thermal schedule influences the number of nuclei and therefore the ultimate size of the metasilicate grains. This is easy to see what is called "over exposure" where so many silver grains (nuclei for lithium metasilicate crystal growth) are produced that the growth in size of the lithium metasilicate grain is limited. The visual characteristic is a colored glassy appearance rather than an opaque darkly colored one.

The ideal situation for effective and efficient etching is one where the lithium metasilicate grains are of sufficient size and number to form a contiguous grain structure. It is this condition that best exploits the differential solubility of the glass and the lithium metasilicate crystallites.

The tunable photosensitivity of the PM glass of the invention allows the end user to have the photosensitivity adjusted to accommodate current processing equipment and avoid exposure from the scattered light. Without the extraneous exposure from scattered light the resolution of the lines is higher and the differential in the etch rate between the exposed and unexposed parts of the PM glass is maintained. The addition of the $TiO_2$ does not significantly change the properties of the glass when, for example, compared to the Fotoform™ glass known in the art. This means that the etch rate, microstructure, degree of warping and the surface roughness remain comparable while the dynamic range of the glass shifts to accommodate higher power exposures.

Figure 2:
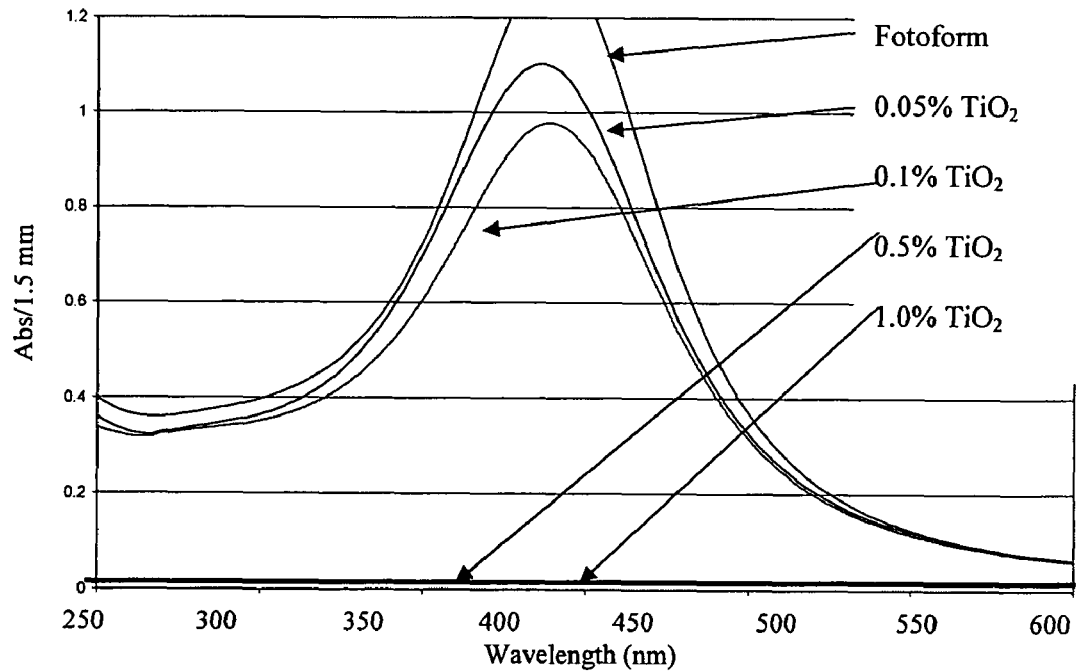
FIG. 2 is a graph of the absorbance vs. wavelength of glasses according to the present invention containing different levels of $TiO_2$, after melted at 1550° C., 64 minute irradiation and a 500° C., 1 hour, air atmosphere silver nucleation step.

The photosensitivity of a PM glass can be estimated by the silver development after the nucleation step. The silver absorption peak occurs between 400 nm and 500 nm. FIG. 1 and FIG. 2 show the decrease in the silver peak in PM glasses of the invention melted at 1450° C. and 1550° C., respectively, with increasing addition of $TiO_2$ compared to the absorption of the commercial Fotoform™ photomachinable glass. The glasses were prepared by melting at 1450° C. and 1550° C., respectively, as indicated and formed into plates 1.5 mm thick. The glass samples were then irradiated, using <400 nm light and subsequently heat treated for one hour at 500° C. after which the silver absorption was measured in the 200-800 nm wavelength range. As FIGS. 1 and 2 indicate, increasing the $TiO_2$ content of the glass decreases the development of the silver in the glass. That is, the absorbance per 1.5 mm thickness after exposure and heat treatment decreases with increasing $TiO_2$ content. This decrease in silver absorbance with increasing $TiO_2$ content has been found to indicate that less silver ($Ag^0$) is formed, thus rendering the less photosensitive.

However, while the evolution of the silver peak is a good indicator of photosensitivity, the actual property of interest is the lithium metasilicate phase production resulting from irradiation and heat treatment, and accompanying properties such as etchability and roughness. FIG. 3 shows PM glass compositions containing 0% (Fotoform), 0.1%, 0.05%, 0.1% and 0.5% $TiO_2$ that have been irradiated with below 400 nm UV light using an Hg—Xe lamp having an output of approximately 8 milliwatts/cm$^2$ (mW/cm$^2$). The irradiation times, in minutes, are indicated on the left side of FIG. 3 and are 0, 0.5, 2, 4 and 8 minutes. The star on the individual pieces shows the location of an area on each piece that has the same opal density (the "OD" area) as the starred area of the other pieces and the star is located at approximately the center of this area. The stars are connected by the solid diagonal grey line. The horizontal, dashed grey lines in FIG. 3 indicate the approximate sections of each piece (labeled as A through E on the right of FIG. 3) that was irradiated for the corresponding time indicated on the left of the FIG. 3. Thus, all sample sections A were not irradiated (0 minutes), sections B were irradiated for a total time of 0.5 minutes, sections C were irradiated for a total time of 2 minutes, etc. The irradiation of the samples was carried out sequentially, with sections being masked once they received the cumulative exposure time indicated on the left of FIG. 3.

After the samples were irradiated, they were to a heat treatment as described in the prior art such U.S. Pat. Nos. 2,628,160, 2,684,911 and other art cited herein. The heat treatment can be a stepwise heat treatment or the temperature during heat treatment can be ramped. As an example of a stepwise heat treatment a PM glass sample is heated at a temperature in the range of 490° C. to 560° C. for a time in the range of 20-40 minutes to reduce the reduce the noble metal ions ($Ag^{+1}$, $Au^{+1}$) present in the glass to the zero valent state ($Ag^0$, $Au^0$) and to enable the individual atoms to migrate in the glass and form clusters. The samples were then subjected to a second, higher temperature heat treatment at a temperature in the range of in the range of 560° C. to 650° C., preferably 560° C. to 600° C., for a time in the range of 20-40 minutes to form the lithium metasilicate phase about the noble metal clusters. The lithium metasilicate phase is then etched away using a 6% to 10% hydrofluoric acid solution leaving the PM glass behind. As has been mentioned above, the irradiation of the PM glass and the two heat treatments produce lithium metasilicate crystallites grown about the noble metal clusters or aggregates that were formed in the first heat treatment.

FIG. 3 shows that for irradiation at constant intensity, the OD area of the PM glasses moves to longer exposure times as the $TiO_2$ content of the glass increases. This is shown by the stars and the diagonal line in FIG. 3. For the 0% $TiO_2$ glass the starred OD area appears after 0.5 minutes irradiation whereas for the 0.1% $TiO_2$ glass the same starred phase does not occur until after the sample has been irradiated for 8 minutes. The 0.5% $TiO_2$ glass does not show a starred OD phase after 8 minutes irradiation, and a longer exposure time will be required for this phase to occur. Thus, using a common OD, FIG. 3 clearly illustrates that one can "tune the sensitivity" of a photomachinable glass by including $TiO_2$ in the glass composition.

The utility of the $TiO_2$ glasses lies in their ability to be matched to a variety of UV light sources. Referring to FIG. 3, the starred opal phase (lithium metasilicate) in the 0% PM glass is sufficient for heat treating and etching to produce the desired product. However, the time for attaining this phase is short, being 0.5 minutes. If a high power laser were used to produce the opal phase as a writing or design on the glass, the laser would have to have a rapid scanning time. By comparison, the glass containing 0.05% $TiO_2$ required 4 minutes to reaching same opalized phase, an 8-fold increase in time, because its photosensitivity has been reduced by inclusion of $TiO_2$. Since development of the opalized phase is a function of both intensity and time, a $TiO_2$-containing PM glass provides flexibility regarding the radiation source. If radiations sources of different intensity are used, one needs only adjust the exposure time to achieve the desired opal phase.

Figure 4A:
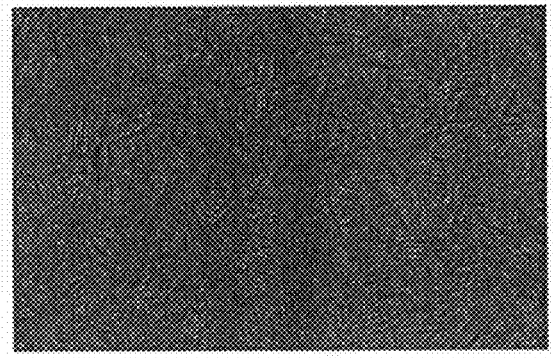
FIG. 4A is a scanning electron micrograph of a PM glass (Fotoform™) that does not contain $TiO_2$ and was melted at 1450° C.
Figure 4B:
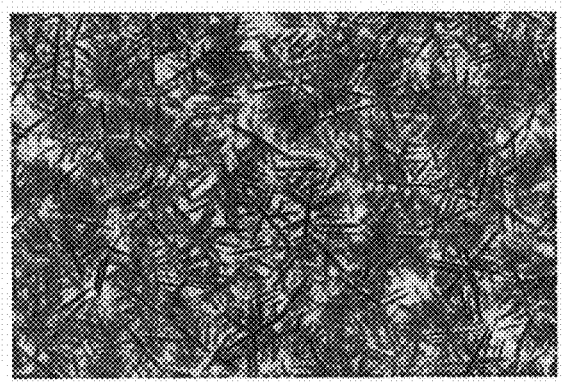
FIG. 4B is a scanning electron micrograph of a PM glass containing 0.05 wt. % $TiO_2$ that was melted at 1450° C.
Figure 4C:
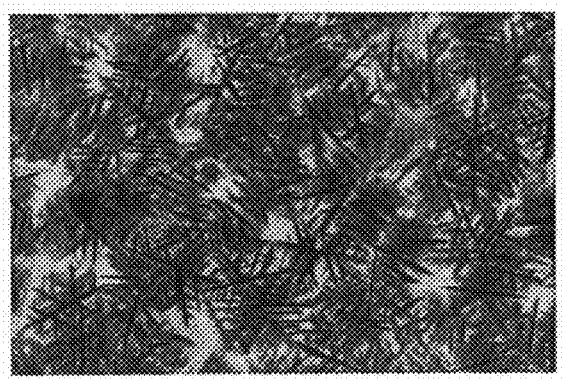
FIG. 4C is a scanning electron micrograph of a PM glass containing 0.05 wt. % $TiO_2$ that was melted at 1550° C.

FIGS. 4A to 4C are scanning electron micrographs ("SEM"), after irradiation and heat treatment, of:
(a) a PM glass that does not contain $TiO_2$ and was melted at 1450° C. (Fotoform™, FIG. 4A);
(b) a PM glass containing 0.05 wt. % $TiO_2$ that was melted at 1450° C. (FIG. 4B); and
(c) a PM glass containing 0.05 wt. % $TiO_2$ that was melted at 1550° C. (FIG. 4C), respectively, The dendritic structure of interlocking needles found in the non-$TiO_2$ glass of FIG. 4A is also found in the $TiO_2$-containing glasses of FIGS. 4B and 4C. These SEM pictures clearly illustrate that addition of the $TiO_2$ does not affect microstructure of the opalized phase in the glasses containing $TiO_2$, although there is some variation in the size of the microstructure which has been found not to affect the photomachinability of the $TiO_2$-containing glasses.

Table 2 shows the etch rate for various $TiO_2$-containing glasses of the invention that were melted compared to commercial Fotoform™ samples. The samples were etched for five minutes in 6% HF and the etch rates are in reference to unexposed glass The data indicates that the etch rate for the $TiO_2$-containing glasses is similar to that of standard Fotoform™ glass.

TABLE 2

| Sample No. | $TiO_2$ (wt. %) | Melt Temp (° C.) | Exposure Time (minutes) | Etch Rate (mm/min) |
| --- | --- | --- | --- | --- |
| Fotoform 1 | 0 | — | 4 | 0.0136 |
| Fotoform 2 | 0 | — | 8 | 0.0192 |
| XP | 0 | 1450 | 4 | 0.0164 |
| XQ | 0.001 | 1450 | 4 | 0.0105 |
| XR | 0.005 | 1450 | 4 | 0.0133 |
| XW | 0.01 | 1450 | 2 | 0.0145 |
| XX | 0.05 | 1450 | 8 | 0.0210 |
| XT | 0.05 | 1450 | 8 | 0.0149 |
| XU | 0.1 | 1450 | 8 | 0.0082 |
| XZ | 0.05 | 1550 | 2 | 0.0165 |
| YA | 0.1 | 1550 | 2 | 0.0061 |
| YB | 0.05 | 1550 | 32 | 0.240 |
| YB | 0.05 | 1550 | 64 | 0.0303 |
| YC | 1.0 | 1550 | 64 | 0.0273 |

Figure 5A:
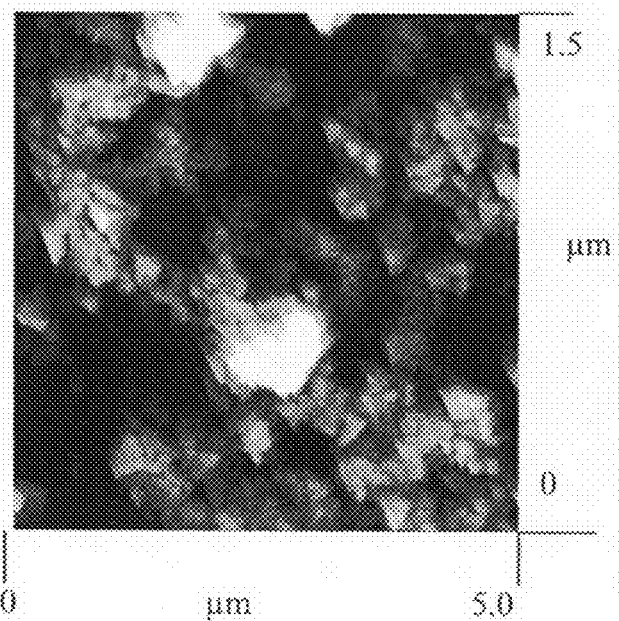
FIG. 5A is an AFM micrograph illustrating the surface roughness of Fotoform™ glass.
Figure 5B:
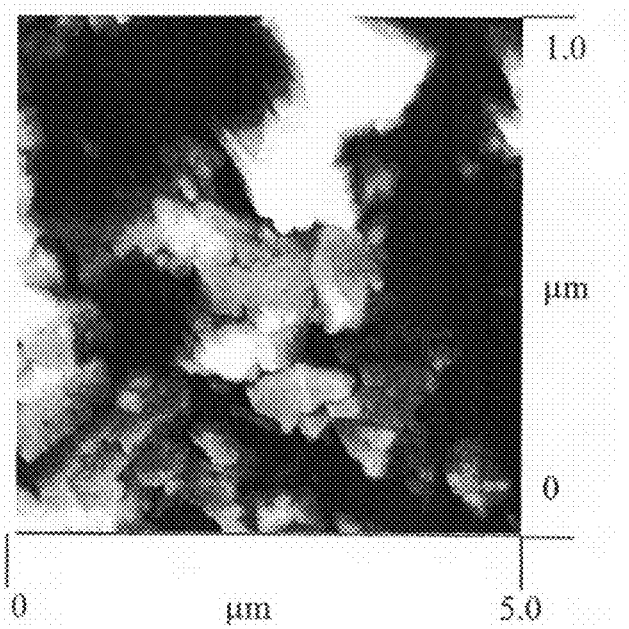
FIG. 5B is an AFM micrograph illustrating the surface roughness of a 1.0 wt. % $TiO_2$-containing photomachinable glass.

FIGS. 5A and 5B are AFM (atomic force micrographs) of Fotoform™ glass (no $TiO_2$) and a glass of the invention containing 1.0 wt % $TiO_2$, respectively. The roughness of the FIG. 5A Fotoform™ glass has a range of 184-332 nm RMS and the roughness of the FIG. 5B glass containing 1.0 wt % $TiO_2$ has a range of 232-306 nm RMS. FIGS. 5A and 5B show triangular shaped artifacts due to the tip of the AFM probe interacting with the surface roughness of the samples. As a result, while these roughness values are only approximations, they suffice to illustrate that the roughness of the FIG. 5B glass containing 1.0 wt % $TiO_2$ similar to that of the FIG. 5B Fotoform™ glass.

The PM glasses have both functional and decorative uses. For example, in one aspect the invention is directed to glass screens or covers, including touch screens, made of a PM glass composition as described herein, the touch screens optionally including one or a plurality of openings therethrough suitable for placement of any control mechanisms. For example without limitation, buttons, plug receptors and any other control mechanisms required by the device with which the PM glass screen is being used can extend from the inner working of the device through etched openings in the PM glass. In another aspect the glass screens or covers not only have openings for the buttons, plug receptors and any other control mechanisms required by the device but the screens or covers, when sold to a consumer, can be personalized as specified by the consumer by additional writing using below 400 nm radiation to form opacified writings, the term "writing" including script, block letters, pictures, diagrams or any other form.

In yet a further embodiment the invention is directed to a PM glass of any composition as described herein, the glass being chemically strengthened, after heat treatment and etching, by ion exchanged using an ion-exchange bath containing potassium ions, sodium ions or a mixture of potassium and sodium ions.

Obviously, numerous modifications and variations of the present invention are possible. It is, therefore, to be understood that within the scope of the following claims, the invention may be practiced otherwise than as specifically described. While this invention has been described with respect to certain preferred embodiments, different variations, modifications, and additions to the invention will become evident to persons of ordinary skill in the art. All such modifications, variations, and additions are intended to be encompassed within the scope of this patent, which is limited only by the claims appended hereto.

We claim:

1. A photomachinable glass composition having a controllable or tunable photosensitivity, said glass comprising, in weight percent (wt. %), 65-80% $SiO_2$, 15-20% $Li_2O$, 1-4% $Na_2O$, 1-4% $K_2O$, 2-10% $Al_2O_3$, 0-3% ZnO, 0-0.15% $Sb_2O_3$, 0-0.015% $CeO_2$, 0-0.001 Au, 0-0.015% Ag and >0.01% to 2% $TiO_2$, and Ag+Au is greater than zero.

2. The photomachinable glass composition according to claim 1, wherein the $TiO_2$ is in an amount in the range of >0.01% to 1%.

3. A photomachinable glass composition having a controllable or tunable photosensitivity, said glass comprising, in weight percent (wt. %), 70-80% $SiO_2$, 15-20% $Li_2O$, 1-2% $Na_2O$, 2-4% $K_2O$, 2-4% $Al_2O_3$, 0-2% ZnO, 0.05-0.15% $Sb_2O_3$, 0.005-0.015% $CeO_2$, 0-0.001% Au, 0.05-0.015% Ag and >0.01% to 2% $TiO_2$, and Ag+Au is greater than or equal to 0.05%.

4. The photomachinable glass composition according to claim 3, wherein the $TiO_2$ is in the range of >0.01% to 1%.

5. A photomachinable glass composition having a controllable or tunable photosensitivity, said glass comprising, in weight percent (wt. %), 65-75% $SiO_2$, 15-20% $Li_2O$, 1-4% $Na_2O$, 1-2% $K_2O$, 5-10% $Al_2O_3$, 1-3% ZnO, 0-0.05% $Sb_2O_3$, 0-0.005% $CeO_2$, 0-0.001% Au, 0-0.05% Ag and >0.01% to 2% $TiO_2$, and Ag+Au is greater than zero.

6. The photomachinable glass composition according to claim 5, wherein the $TiO_2$ is in the range of >0.01% to 1%.

* * * * *